United States Patent [19]

Reibetanz et al.

[11] 4,050,345
[45] Sept. 27, 1977

[54] SELF DRILLING ANCHORING DOWEL

[75] Inventors: Wilbert Reibetanz, Leinfelden; Karl Wanner, Echterdingen; Reinhard Hahner, Ostfildern, all of Germany

[73] Assignee: Robert Bosch G.m.b.H., Stuttgart, Germany

[21] Appl. No.: 657,106

[22] Filed: Feb. 11, 1976

[30] Foreign Application Priority Data

Feb. 28, 1975 Germany .............................. 2508635

[51] Int. Cl.$^2$ .......................... E04B 1/44; F16B 13/06
[52] U.S. Cl. ........................................ 85/68; 408/226
[58] Field of Search ................ 85/68, 74, 75, 76, 72; 408/226, 204; 279/99, 103; 175/405, 404, 403, 395, 394

[56] References Cited

U.S. PATENT DOCUMENTS

| | | | |
|---|---|---|---|
| 1,621,598 | 3/1927 | Phillips | 85/68 |
| 1,820,644 | 8/1931 | Bach | 279/99 |
| 1,839,316 | 1/1932 | Jacobs | 279/103 |
| 2,171,985 | 9/1939 | Mushet | 85/68 |
| 3,202,035 | 8/1965 | Rosselet | 85/68 |
| 3,467,209 | 9/1969 | Chromy | 85/68 X |

FOREIGN PATENT DOCUMENTS

| | | | |
|---|---|---|---|
| 2,123,897 | 11/1972 | Germany | 85/68 |
| 6,616,590 | 5/1968 | Netherlands | 85/68 |

*Primary Examiner*—Ramon S. Britts
*Attorney, Agent, or Firm*—Michael J. Striker

[57] ABSTRACT

A self drilling anchoring dowel for drilling a hole into a hard support structure and anchoring in this hole to be available as a fixture by means of which an object may be attached to the support structure. The dowel is formed as an elongated dowel body having a front end and a rear end. At the front end, a drilling head is formed and, spacedly from the rear end, a circumferential weakened zone is provided in the wall of the dowel body in which zone the thickness of this wall is diminished. Thus, at the rear end of the dowel body, a rear terminal section is delimited which may be broken off therefrom after the dowel has been driven to a desired depth into the structure, so that a front end is provided on the dowel body which end is substantially flush with the structure surface. A longitudinal bore inside the dowel body extends therethrough and is available for removing from the drilled hole waste chips and dust produced by drilling. The bore is constricted in the region of the drilling head for preventing entrance into the bore of large chips of the severed material possibly jamming the bore.

The dowel is devised to be used in connection with a hammer drill having exhausting means, so that the waste chips and drilling dust are evacuated and do not infest the surrounding atmosphere. The rear terminal section of the dowel body is configurated to be engageable by a dowel holder attached to the hammer drill.

14 Claims, 6 Drawing Figures

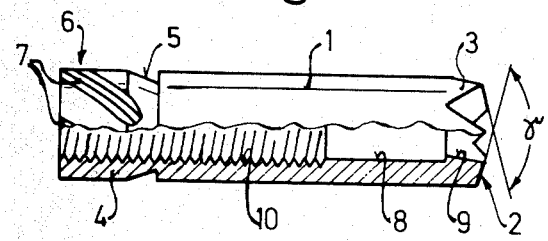
Fig. 1
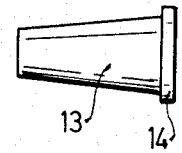
Fig. 2
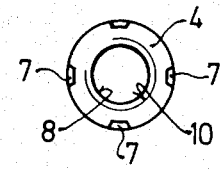
Fig. 3
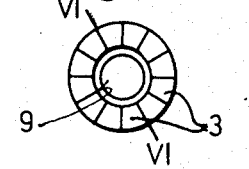
Fig. 4
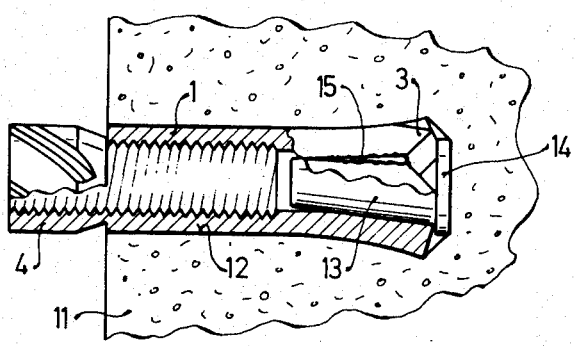
Fig. 5
Fig. 6

SELF DRILLING ANCHORING DOWEL

BACKGROUND OF THE INVENTION

The present invention relates to an improved self drilling anchoring dowel fixable inside a hard support structure and having an elongated substantially cylindrical body and a coaxial bore therein and provided at its front end with an indented drilling head and at its rear end with a rear terminal section.

Where mention is made herein of a hard support structure, it is to be understood to mean a structure made of, or consisting in, a strong material, such as rock, concrete, masonry work or any other material of hard characteristics, but substantially brittle.

Self drilling anchoring dowels of this type known in the art are constructed so that they are coupled by means of special instruments via holding cones with pressurized air drill hammers and are drilled into the mass of a hard structure by combined hammering and drilling motions. The depth of the hole drilled is determined by the configuration of the special instrument utilized. After a hole of a desired depth has been drilled, the hammer drill is pulled out from the drilled hole, together with the instrument whereto it is coupled.

During the drilling operation, the drilled hole must be cleaned to force out of it any chips and dust produced by the drilling operation. This is performed, according to the prior art, by air blasting. However, blasting causes a great amount of dust to be expelled from the drilled hole and dispersed through the surrounding air. The dust dissipates far throughout the working area and may exceed the maximum allowable concentration in the atmosphere, so that the operator may suffer therefrom and be exposed to health risk when inhaling the dust.

As an alternative, it has proved to be very useful to exhaust the particulate material through a central bore provided in the drilling dowel.

In the prior art, self drilling anchoring dowels have been known, which dowels had along their entire length an axial bore and an unchanging diameter. The bore was often slightly enlarged at the front inlet of the drilling head. The front side of the dowel body was provided at its drilling head with more or less steep teeth sloping towards the center of the dowel body.

These known constructions have not proven to be efficient. Even if provided with a coaxial bore arranged for withdrawal the particulate material, these dowels of the known constructions have been ineffective in regard to exhaustion from the drilled hole of the dust originated by the drilling operation. This shortcoming results from the fact that, during the drilling, there are broken off from the hard material pieces of lens-like form known as "stone lenses". The lenses are drawn by the applied suction into the bore of the dowel body. The diameters of these lenses are usually nearly as great as, or only slightly smaller than, the diameter of the bore existing in the drilling head of the dowel. It has been already mentioned that in the known self drilling anchoring dowels the drilling head has the front inlet to the bore slightly enlarged. Thus, the pieces called "stone lenses" tend to become wedged in the bore behind the enlarged inlet, since here the bore has a diameter smaller than that existing in the drilling head. Moreover, all the otherwise configurated chips broken off by drilling accumulate over and around these lenses until the dowel bore becomes totally clogged. When this occurs, the exhaustion of the drilling waste material and of dust is interrupted and further drilling is hampered.

SUMMARY OF THE INVENTION

It is therefore an object of the present invention to provide an improved self drilling anchoring dowel of the above indicated type which assures a throuble-free and continuous exhausting of the drilled chips and dust through a bore extending through the dowel body.

It is another object of the present invention to provide a self drilling anchoring dowel of the above mentioned type which is provided at its front inlet in the drilling head with a constriction communicating with the bore inside the dowel body.

It is a concomitant object of the present invention to provide a self drilling anchoring dowel of the above indicated type arranged in a manner such that the size of the chips broken off during the drilling operation does not exceed the diameter of the constriction provided at the front inlet of the drilling head.

It is a further object of the present invention to provide a self drilling anchoring dowel of the above specified type, wherein the bore passing through the dowel body from said construction is enlarged to its normal diameter, so that it provides a sufficient space for passage of the broken-off chips and that these chips do not clog the bore.

It is still another advantageous object of the present invention to provide for breaking of the hard material into small pieces by arranging at the front side of the dowel body cutting teeth having edges which include between themselves an acute angle of between 120° and 160° and by making the walls of the cutting edges slope outwardly, so that the cutting edges extend inwardly and initiate the biting into the hard material thereupon, so that but small chips are cut off, said chips being sized so that they may be easily removed through the bore traversing the dowel body.

It is yet another object of the present invention to provide an improved self cutting anchoring dowel of the above described type having the front drilling head provided with conical teeth having cutting edges on the interior of the drilling head, wherein this configuration of the cutting edges makes possible a very easy and unobstructed centering of the dowel, including during the drilling operation.

Still another object of the present invention is to provide the above mentioned improved self drilling anchoring dowel with a rear terminal section which transits around its periphery into an annular weakened zone, which zone attenuates the wall connecting this section to the remainder of the dowel body, so that this rear terminal section may be easily separated from the dowel body after a hole of the desired depth has been drilled into the hard material, thus providing the rear end of the dowel body with a rear surface which is flush with the surface of the support structure.

It is an additional object of the present invention to arrange in a self drilling anchoring dowel such a rear terminal section which is provided on its surface with means configurated to correspond to a receiving cavity provided in a dowel holder attached to a hammer drill, so that this section may be entrained, being inserted into this dowel holder, by the same and therethrough by the hammer drill to share its rotational movement, and to drill the desired hole.

A further object of the present invention is to provide a self drilling anchoring dowel body which is not superficially grooved and is made of a steel having structurally weaker areas enabling the dowel body to be adjusted by pressure to the drilled hole and to engage the hole wall in these areas.

Still another object of the present invention is to provide a self drilling anchoring dowel of the above indicated type which is combinable with a conical member insertable into the port of the dowel drilling head, which conical member spreads out the port under pressure exerted on the dowel and causes the port to burst and to form sidewardly deflected lugs engaging the wall of the drilled hole and thus securing the dowel in a firmly anchored position inside the hole drilled into the hard material.

It is finally a further object of the present invention to provide a self drilling anchoring dowel engageable for being driven by a hammer drill and having inside its body a bore longitudinally extending between its ends, so that a suction arrangement connected to the hammer drill may exhaust through the longitudinal bore the chips or dust broken off and separated from the hard material and thus obviate the obnoxious dispersion of the dust thus generated through the ambient atmosphere.

Accordingly, the invention is concerned with achieving these and other beneficial objects by providing a self drilling anchoring dowel utilizable for drilling holes into a hard support structure and intended to be left anchored in the hole drilled thereinto as an element whereto various other objects may be attached. This dowel comprises a dowel body being of a substantially cylindrical configuration. At the front side of this body, an indented drilling head is formed. A longitudinal bore extends throughout the dowel body and the drilling head. Through this bore, the chips broken off the hard material together with the dust produced by drilling may be forwarded outwardly. Especially advantageous is thereby the exhaustion of these chips and of the dust through the dowel bore. In order to control the passage of chips of appropriate sizes through the dowel bore, the inlet terminating the longitudinal bore passing through the dowel body and the drilling head is constricted at the end of the drilling head for preventing entrance into the bore of broken chips that could clog the same.

For achieving the drilling effect, the indentation of the drilling head is in the form of substantially conical teeth. These teeth advantageously have cutting edges which include between each adjacent pair thereof an angle of between 120 and 160°, the root regions of these cutting edges in adjacent pairs thereof also being positioned at this angle.

A good drilling effect is enhanced by inclination of the apex zones of the conical teeth for making these sides sloping outwardly, so that the cutting edges of the conical teeth are located at the interior side of these teeth. Thus, an effective biting of the cutting edges into the hard material is ensured and the dowel is enabled to be centered also during the drilling operation.

The outer surface of the wall of the cylindrical dowel body is preferably continuously circularly cylindrical along its entire length, so that its shape does not obstruct the dowel motion into the hole during its drilling into the hard material.

The dowel also is constructed so that a rear portion thereof which could be mutilated by the hammer strokes may be detached after the drilling has been terminated. For this purpose, the dowel has at its rear terminal a rear terminal section delimited from the remainder of its body of an annular circumferential weakened zone in the wall thereof. This zone is an area where the thickness of the dowel wall is substantially diminished, so that the rear terminal section may be readily separated along the weakened zone from the remainder of the dowel body.

It is intended to use a hammer drill as the dowel actuator. Such hammers have holders engageable with the holder attached to the hammer drill to be utilized.

In order to obtain an effective coupling to the holder, the rear terminal section is provided on its wall surface with engagement means configurated to mate with a cavity in the hammer holder. Thus, after this holder is engaged with the mentioned rear terminal section, the drilling hammer is enabled to transmit its rotational strokes to the dowel and thus to cause the same to perform the drilling.

The engagement means are preferably at least two, or a plurality of, crosswise extending threads formed on the outer surface of the wall of the rear terminal section of the dowel body.

The invention also provides for preventing broken off chips of excess sizes to penetrate into the longitudinal bore inside the dowel body. For achieving this, the diameter of this bore in the region of the port of the drilling head is constricted, it being preferable to make it by about 20% smaller than the diameter of the bore in the remaining part of the dowel body.

Also, means are available which are capable of causing the dowel to firmly anchor inside the hole drilled into the hard support structure. For this purpose, a conical member is provided which is insertable from behind into the port of the drilling head. When this conical member is so inserted into this port, it spreads it out under continuous drilling strokes and causes it to burst and to form outwardly deflected lugs. These lugs then firmly engage the hole drilled into the hard support structure.

This conical member is constructed so that it cannot become entrapped by excess friction on the bottom of the drilled hole and obstruct rotation of the drilling dowel. For this purpose the base of this member has a smooth surface whose friction with the bottom of the drilled hole is minimized. This base also has a circumferential flange of a diameter smaller than that of the dowel body, so that there is no danger of its friction with the side wall of the hole drilled into the hard material.

A further provision is made by the invention for enabling the dowel to be firmly anchored in the drilled hole. The dowel body is formed so that it is partially flexible and prone to burst. For achieving this effect, the dowel body is made of a steel having structurally weaker areas, so that under pressure exerted on the dowel body this body adjusts itself, by bowing out or cracking, in these areas to the drilled hole and engages its wall.

A preferred steel to be used is that containing manganese sulfite nuclei in its lattice, in particular, a steel containing between 0.21 and 0.34% of sulphur and between 0.86 and 1.36% of manganese.

The novel features which are considered as characteristic for the present invention are set forth, in particular, in the appended claims. The invention itself, however, both as its construction and its method of operation are concerned, together with additional objects and advantages thereof, will be best understood from the following description of specific embodiments when read in connection with the accompanying drawings.

BRIEF DESCRIPTION OF THE DRAWINGS

FIG. 1 shows an embodiment of the self-drilling dowel according to the invention in a partially sectional view;

FIG. 2 shows an expanding cone utilizable with the self-drilling dowel illustrated in FIG. 1;

FIG. 3 is a view of the front surface of the tail section of the embodiment of the dowel illustrated by FIG. 1;

FIG. 4 is a view of the front side of the dowel of the embodiment illustrated in FIG. 1 displaying the cutting edges there provided; and FIG. 5 shows the self-drilling dowel inside a hole drilled into a stony material, the tail section being still not separated.

FIG. 6 is a partially sectioned view of the head of the dowel taken through the line VI.VI of FIG. 4, which line extends through the root regions of the teeth.

DESCRIPTION OF THE PREFERRED EMBODIMENT

In FIG. 1, a self drilling anchoring dowel according to the present invention is illustrated.

This dowel is intended to be used for drilling a hole into a very hard support structure whereto some object is to be attached by means of the dowel. The hard structure is to be understood as being a structure made of, or consisting in, a rocky, stony, concrete, masonry and the like material of a high hardness, but of a substantially brittle consistency. This material will be alluded to hereinafter simply as a "stony material."

In the embodiment of the invention shown in FIG. 1, the dowel has a cylindrical elongated dowel body 1 having on the surface thereof no grooves and no slits. A drilling head 2 is located at the front end of this dowel body 1. This drilling head 2 includes a front collar provided with conical teeth 3 extending from the front side thereof. These teeth 3 have cutting edges positioned substantially radially and extending in each adjacent pair thereof in interrelationship at an acute angle of between 120° and 160°. In this embodiment, this acute angle is 155°.

Each of the pairs of adjacent teeth 3 has a tooth root region wherein the cutting edges of each pair of adjacent teeth are also positioned at an angle of between 120° and 160°.

A rear terminal section 4 is located at the rear end of the dowel body 1. The outer diameter of this rear terminal section 4 is equal to the outer diameter of the dowel body 1. This rear terminal section 4 is delimited from the remainder of the dowel body 1 by an annular peripheral weakened zone 5 cut into the wall of the dowel body 1. This zone 5 forms an area where the rear terminal section 4 may be broken off the dowel body 1. This section 4 also has on its outer surface engagement means 6 configurated to mate with corresponding means in a dowel holder provided in a hammer drill, so that the engagement between this section 4 and the dowel holder causes rotational entrainment of the dowel for the drilling operation. Neither the hammer drill nor the dowel holder appear displayed in FIG. 1. The engagement means provided on the rear terminal section 4 are steep screw threads 7. These steep screw threads 7 are symmetrically distributed around the periphery of the rear terminal section 4, extend along the entire axial length thereof and end in the peripheral weakened zone 5.

FIGS. 1 and 3 make apparent that these steep screw threads 7 have trapezoidal cross-section.

A bore 8 extending through the rear terminal section 4 and the dowel body 1 coaxially therewith serves for transporting the chips broken off the stone mass, such as for instance a masonry work, by the dowel drilling operation, together with any dust particles.

The drilling head 2 located at the front end of the dowel body 1, contains at its end a constricted port 9 of the bore 8. The diameter of the constriction is by about 20% smaller than the remaining diameter of the bore 8. In the embodiment shown in FIG. 1, the diameter of the bore 8 is between 8 and 10 mm, while the diameter of the constricted port 9 is between 9 and 8 mm.

The bore 8 has at its rear end adjacent the rear terminal section 4 a thread 10.

The self drilling anchoring dowel according to the invention is especially suitable for being used in connection with a hammer drill having a dust suction bore. In this particular case, the drilled off chips and the dust are exhausted through the central bore 8 of the dowel body 1. To enable this procedure, the hammer drill is equipped with a suitable suction device.

The self drilling anchoring dowel is inserted, while the suction device operates, into the dowel holder of the hammer drill. The dowel holder is provided with a cylindrical pocket cavity and has a bottom communicating with a duct connected to the suction device. The cylindrical inner wall of said pocket cavity is provided with four screw-like extending projections. These projections are arranged in a manner such that they mate with, and engage, the steep threads 7 on the rear terminal section 4 of the dowel. The dowel is arranged to be screwed into the dowel holder until the rear surface of the rear terminal section 4 abuts the bottom of the pocket cavity of the dowel holder. Before the self drilling anchoring dowel is set onto the stony matter it has to drill, this dowel is kept in position by the ambient pressure, because during this period of time a lowered pressure prevails in bore 8 due to the action of the suction device. In this way, the self drilling anchoring dowel is prevented from falling out of the dowel holder.

The drilling head 2 is formed with conical teeth having cutting edges that are steeply inclined outwardly. It is apparent that when the drilling operation is started, the drilling head 2 touches and bits into the stony mass with its internally located cutting edges. Thus, the centering of the dowel is highly facilitated.

The initially broken off stony material is exhausted through the bore 8 by action of the suction device. Because of the shape and orientation of the teeth, the stony material is the form of "stone lenses" broken off during drilling is sized to at most approach the diameter of the constricted port 9. These "stone lenses" therefore cannot jam inside the bore 8 and clog the same, so that no obstacle arises to the passage of the lenses or chips through the bore 8.

Even if suction removal of the material is not carried out, the dowel also would not be clogged by the broken chips or lenses of the stony material. These chips and lenses are relatively very small, owing to the selected cutting geometry and to the constricted port 9. Consequently, they pass easily through the dowel bore 8 under all conditions.

The rotational movement is transmitted by the dowel holder to the rear terminal section 4 being engaged therewith. The drilling impact affects the rear surface of the rear terminal section 4, which abuts the bottom of the dowel holder. It has been already mentioned that a pressure is developed due to the action of the suction device. Thus, there exists a friction pressure exerted on the dowel between the outer wall of the cylindrical dowel body 1 and the wall of the hole drilled into the stony mass. Due to the force thus originated, the rear terminal section 4 is in a certain sense screwed into the dowel holder and the dowel is being kept inside the dowel holder both during the drilling and the withdrawal from the drilled hole.

The dowel of the invention is put in operation as follows:

First, the dowel is caused to drill in the described manner an initial hole 12 into the stony mass, being for instance a masonry work 11 (compare FIG. 5). This hole is drilled purposefully so deep that the weakened zone 5, delimiting the rear terminal section 4 from the cylindrical dowel body 1, disappears by about one half of its axial length in the drilled hole. Thereafter, the dowel is withdrawn from the initial drilled hole. Outwardly of the hole, a conical member 13 (see FIG. 2) is inserted into the constricted port 9 at the end of the bore 8. This conical member 13, insertable into the constricted port 9 of the bores, has, at its distal terminal remote from its inserted end, a base 14 having a flange of a diameter greater than that of the largest diameter of the conical member 13, but smaller than, or at the most equal to, the diameter of the cylindrical dowel body 1. This flanged base 14 has a smooth surface to contact the bottom of the drilled hole. After this conical member 13 has been so inserted into the drilling head 2, the self drilling dowel body 1 is once more introduced into the hole 12 drilled into the stony mass. Now, the flanged base 14 of the conical member 13 sits in the bottom of the drilled hole. The drilling strokes force the dowel body 1 to slide on, and to expand over, this conical member 13 until the teeth 3 of the drilling head 2 contact the surface of the flanged base 14. This motion of the drilling head 2 over the conical member 13 causes radial dilation of this front portion of the dowel body 1 and possibly a bursting of the drilling head 2, so that the dowel body 1 becomes anchored inside the drilled hole on its expanded drilling head 2 and possibly on tongue-like projections formed by said bursting.

After the dowel of the invention has been anchored inside the drilled hole 12 due to the above mentioned operation, the rear terminal section 4 projecting from the drilled hole is broken off along the existing peripheral weakened zone 5, so that the dowel exposed end remains substantially flush with the surface of the support structure, such as a masonry work 11. The threads 10 arranged at the rear end of the bore 8 are available for fixation on the dowel body 1 of an object which is intended to be attached to the support structure.

After the rear terminal section 4 has been broken off the remainder of the dowel body 1, it still sits thereupon. This rear terminal section 4 may be easily separated, because air is being exhausted through the enlarged diameter of the bore 8 via this rear terminal section 4, so that no additional force urges this section to remain sitting on the dowel body 1. Besides, there does not exist any holding force capable of keeping the rear terminal section 4 inside the dowel holder of the hammer drill. Thus, just several strokes of the hammer drill are sufficient for pushing the separated rear terminal section 4 from the dowel holder and there is no need to use any additional instrument for withdrawing this section from the dowel holder.

The flanged base 14 impedes the conical member 13 to penetrate during the dilation of the dowel drilling head 2 into the bottom of the drilled hole, and/or to straddle thereupon.

It also can happen that the strokes drive the dowel drilling head 2 over the conical member 13 and behind it. Thus, longitudinal cracks 15 are engendered in the region of this drilling head, said cracks 15 starting from the root region of the teeth 3. Thus, lugs are produced which are bent outwardly and provide engagement with the stony mass of the hole. The strength of this engagement depends on the solidity of the stony material.

In the foregoing, mention has been made that the self drilling anchoring dowels known in the prior art were provided with longitudinal and/or transverse grooves facilitating cracking. Such grooves are omitted in the self drilling anchoring dowel of the present invention.

The omission of these grooves is possible thanks to the manufacture of the self drilling anchoring dowel of the invention from a steel having structurally weaker areas prone to longitudinal bursting or bowing. Manganese sulfite lines longitudinally extending in steel laminates and forming during steel laminating are favorable for the creation of longitudinal cracks. A steel particularly proper for this purpose is one containing between 0.21 and 0.34% of sulphur and between 0.86 and 1.36% of manganese.

While the invention has been illustrated and described as embodied in FIGS. 1 to 6, it is not intended to be limited to the details shown, since various modifications and structural changes may be made without departing in any way from the spirit of the invention.

It will be understood that each of the elements described above, or two or more together, may also find a useful application in other types of devices differing from the type described hereinabove.

Without further analysis, the foregoing will so fully reveal the gist of the present invention that others can, by applying just current knowledge, readily adapt it for various applications, without omitting features that, from the standpoint of prior art, fairly constitute essential characteristics of the generic or specific aspects of this invention.

What is claimed as new and desired to be protected by Letters Patent is set forth in the appended claims:

1. A self drilling anchoring dowel adapted to drill, when rotated about its axis, a hole into a hard support structure and to remain anchored in said hole as a fixture for attachment to said structure of an object which is to be coupled thereto, said dowel comprising an elongated substantially cylindrical dowel body having a longitudinal axis and axially spaced front and rear ends; an annular drilling head at said front end, said drilling head being provided at its front end with an annular projecting collar having a plurality of peripherally distributed substantially conical teeth having cutting edges, the cutting edges of each of adjacent pairs of said teeth including with one another an angle of between 120° and 160°, each adjacent pair of said conical teeth forming a root region, said cutting edges extending to said root region and thereat also including an angle of between 120° and 160° with one another; and means for removing drilling dust and chips, said means including a bore axially extending between said front end and said rear end of said dowel body and a constricted part located within the confines of said drilling head defining a port communicating with said bore, the diameter of said port being smaller than the diameter of said bore.

2. A self drilling anchoring dowel as defined in claim 18, wherein said conical teeth have an apex zone sloping outwardly, so that said cutting edges are located at the interior side of said cutting conical teeth.

3. A self drilling anchoring dowel as defined in claim 2, wherein said dowel body has an outer surface being continuously circularly cylindrical over its entire axial length.

4. A self drilling anchoring dowel as defined in claim 3, wherein said dowel has a rear terminal section delimited from the remainder of said dowel body by an annular circumferential weakened zone provided in the wall of said dowel body, so that said terminal section is separable along said weakened zone from said remainder of said dowel body.

5. A self drilling anchoring dowel as defined in claim 4, wherein said rear terminal section is configurated to be engageable with a dowel holder attached to a hammer drill.

6. A self drilling anchoring dowel as defined in claim 5, wherein said rear terminal section is provided on its wall surface with engagement means configurated to mate with a cavity having screw-like projections and provided in said dowel holder attached to a hammer drill utilizable for causing the drilling rotation of said dowel, so that, after said dowel holder is engaged with said rear terminal section, said hammer drill is enabled to transmit motion to said dowel and thus to cause the same to perform the drilling.

7. A self drilling anchoring dowel as defined in claim 6, wherein said engagement means comprises at least two steep crosswise extending threads formed in said outer surface of said rear terminal section and engaging said screw-like projections.

8. A self drilling anchoring dowel as defined in claim 7 wherein a plurality of said crosswise extending threads are formed in said outer surface of said rear terminal section.

9. A self drilling anchoring dowel as defined in claim 8, wherein the diameter of said port is smaller by substantially 25% than the diameter of said bore in said dowel body.

10. A self drilling anchoring dowel as defined in claim 8, further comprising a conical expanding member which is insertable into said port of said drilling head for expanding said port and causing it to burst and form outwardly deflected lugs engaging the hole drilled into the hard support structure.

11. A self drilling anchoring dowel as defined in claim 10, wherein said conical member has a base provided with a radial flange having a diameter smaller than that of the dowel body, so that said conical member engages the bottom of the drilled hole via said base and flange.

12. A self drilling anchoring dowel as defined in claim 11, wherein said dowel body is made of a steel having structurally weaker areas, so that under pressure exerted on said dowel body the same adjusts itself in these areas to the drilled hole and may be caused to engage the wall thereof.

13. A self drilling anchoring dowel as defined in claim 12, wherein said steel is a steel containing manganese sulfite nuclei in its lattice.

14. A self drilling anchoring dowel as defined in claim 12, wherein said steel is a steel containing between 0.21 and 0.34% of sulphur and between 0.86 and 1.36% of manganese.

* * * * *